US007111639B2

(12) United States Patent
McIntyre et al.

(10) Patent No.: US 7,111,639 B2
(45) Date of Patent: Sep. 26, 2006

(54) PRESSURE REGULATOR INCLUDING A PRESS-FIT SPRING RETAINER

(75) Inventors: Brian Clay McIntyre, Suffolk, VA (US); James Archie Wynn, Jr., Virginia Beach, VA (US); Barry Robinson, Williamsburg, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 225 days.

(21) Appl. No.: 10/455,402

(22) Filed: Jun. 6, 2003

(65) Prior Publication Data

US 2003/0226592 A1 Dec. 11, 2003

Related U.S. Application Data

(60) Provisional application No. 60/386,604, filed on Jun. 6, 2002.

(51) Int. Cl.
*G05D 16/02* (2006.01)
*F16K 17/04* (2006.01)

(52) U.S. Cl. ....................................... 137/508; 123/459

(58) Field of Classification Search ................ 137/508, 137/510, 116.5; 123/459
See application file for complete search history.

(56) References Cited

U.S. PATENT DOCUMENTS

| | | | | |
|---|---|---|---|---|
| 2,603,231 | A | 7/1952 | Birkemeier | 137/218 |
| 2,618,290 | A | 11/1952 | Van Vliet | 137/510 |
| 4,660,597 | A | 4/1987 | Cowles | 137/505.42 |
| 5,265,644 | A | 11/1993 | Tuckey | 137/510 |
| 5,435,345 | A | 7/1995 | Robinson et al. | 137/508 |
| 5,901,742 | A | 5/1999 | Kleppner et al. | 137/508 |
| 5,979,409 | A | 11/1999 | Robinson | 123/463 |
| 6,016,831 | A | 1/2000 | Bueser et al. | 137/315 |
| 6,039,030 | A | 3/2000 | Robinson et al. | 123/457 |
| 6,629,543 | B1 * | 10/2003 | Kilgore | 137/508 |

FOREIGN PATENT DOCUMENTS

| | | | |
|---|---|---|---|
| DE | 195 08 637 | A1 | 9/1996 |
| EP | 1 106 821 | A2 | 6/2001 |

OTHER PUBLICATIONS

PCT Search Report Application No. EP 03 01 2807; Date of completion: Sep. 10, 2003.

* cited by examiner

*Primary Examiner*—Stephen M. Hepperle

(57) ABSTRACT

A pressure regulator includes a housing, a divider including a first valve member, and a second valve member. The housing includes an inlet and an outlet, and defines an interior volume. The divider separates the interior volume into first and second chambers, and included the first valve member, a diaphragm, and a retainer. The diaphragm extends between the housing and the first valve member. Fluid communication between the first and second chambers through the diaphragm being prevented. The retainer secures the diaphragm relative to the first valve member, and the retainer is press-fitted with respect to the first valve member. The second valve member is arranged between first and second configurations relative to the first valve member. The first configuration substantially prevents fluid communication between the inlet and the outlet, and the second configuration permits fluid communication between the inlet and the outlet.

15 Claims, 5 Drawing Sheets

PRESSURE REGULATOR INCLUDING A PRESS-FIT SPRING RETAINER

CROSS REFERENCE TO CO-PENDING APPLICATIONS

This application claims the benefit of the earlier filing date of U.S. Provisional Application No. 60/386,604, filed Jun. 6, 2002, the disclosure of which is incorporated by reference herein in its entirety.

FIELD OF THE INVENTION

A fuel pressure regulator relieves over-pressure in a fuel supply line between a fuel tank and an internal combustion engine. In particular, the fuel pressure regulator is responsible for supplying fuel, at or below a selected pressure, to a fuel injector of the internal combustion engine.

BACKGROUND OF THE INVENTION

Most modern automotive fuel systems utilize fuel injectors to deliver fuel to the engine cylinders for combustion. The fuel injectors are mounted on a fuel rail to which fuel is supplied by a pump. The pressure at which the fuel is supplied to the fuel rail must be metered to ensure the proper operation of the fuel injectors. Metering is carried out using pressure regulators that control the pressure of the fuel in the system at all engine r.p.m. levels.

Referring to FIG. 5, there is illustrated a known flow-through type pressure regulator 10 having a first cup shaped cover 12 and a second cup shaped cover 14 that are crimped together to form an unitary hollow member. In the axially aligned center of the enclosed end 16 of the first cover 12 is an outlet port 18 wherein fuel flows out of the regulator 10. Around the bottom 20 of the enclosed end 22 of the second cover 14 is located at least one fuel inlet aperture 24 for receiving fuel into the regulator 10.

The known flow-through type pressure regulator includes a bias means such as a spring 30 that functions to bias a valve seat member 36 of the regulator 10 at a predetermined amount of pressure that relates to the pressure desired by the regulator. One end of the spring 30 is located in a spring retainer 34 that is secured to a portion of the valve seat member 36 that extends through a central aperture 38 in a diaphragm 40. The diaphragm 40 is supported around its circumference on a circumferential flange 42 radially extending from the open end 44 of the second cover 14 and is crimped between a circumferential flange 46 extending radially outward of the open end 48 of the first cover 12. At the enclosed end 22 of the second cover 14 is a valve 50 that is secured to the second cover 14.

According to the known flow-through pressure regulator, the spring retainer is staked to the valve seat member 36. It is believed that the known flow-through type pressure regulator, as well as other types of pressure regulators, suffer from a number of disadvantages including a manufacturing process that requires additional assembly operations as well as tooling to perform the staking.

Thus, it is believed that there is a need to provide pressure regulators, e.g., of the flow-through and by-pass valve types, that overcome the disadvantages of the known pressure regulators.

SUMMARY OF THE INVENTION

The present invention provides a pressure regulator. The pressure regulator includes a housing, a divider including a first valve member, and a second valve member. The housing includes an inlet and an outlet, and defines an interior volume. The divider separates the interior volume into first and second chambers, and included the first valve member, a diaphragm, and a retainer. The diaphragm extends between the housing and the first valve member. Fluid communication between the first and second chambers through the diaphragm being prevented. The retainer secures the diaphragm relative to the first valve member, and the retainer is press-fitted with respect to the first valve member. The second valve member is arranged between first and second configurations relative to the first valve member. The first configuration substantially prevents fluid communication between the inlet and the outlet, and the second configuration permits fluid communication between the inlet and the outlet.

The present invention also provides a pressure regulator. The pressure regulator includes a housing that defines an interior volume, a divider that separates the interior volume into first and second chambers, and two valve member that are arranged between first and second configurations relative to one another. The housing includes a first housing portion that includes an inlet, a second housing portion, and an outlet. The divider includes a first one of the valve members, a diaphragm that extends between the housing and the first one of the valve members, and a retainer that secures the diaphragm relative to the first one of the valve members. The retainer is press-fitted with respect to the first one of the valve members. The first configuration of the two valve members substantially prevents fluid communication between the inlet and the outlet, and the second configuration of the two valve members permits fluid communication between the inlet and the outlet. Fluid communication through the diaphragm is prevented.

The present invention also provides a method of manufacturing a flow-through pressure regulator. The flow-through pressure regulator includes a first valve element that is mounted in a housing, a second valve elements that is movable with respect to the first valve element, and a divider that separates the housing into first and second chambers and supports the second valve element relative to the housing. The housing has an inlet and an outlet. A first configuration of the second valve element prevents a flow of fluid between the inlet and an outlet, and a second configuration of the second valve element permits the flow of fluid between the inlet and an outlet. The method includes assembling the divider and mounting the divider in the housing. The assembling the divider includes positioning a diaphragm with respect to the second valve element, and press-fitting a retainer with respect to the second valve element. The press-fitting includes sandwiching the diaphragm between the second valve element and the retainer. And the mounting the divider in the housing separates the first and second chambers.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
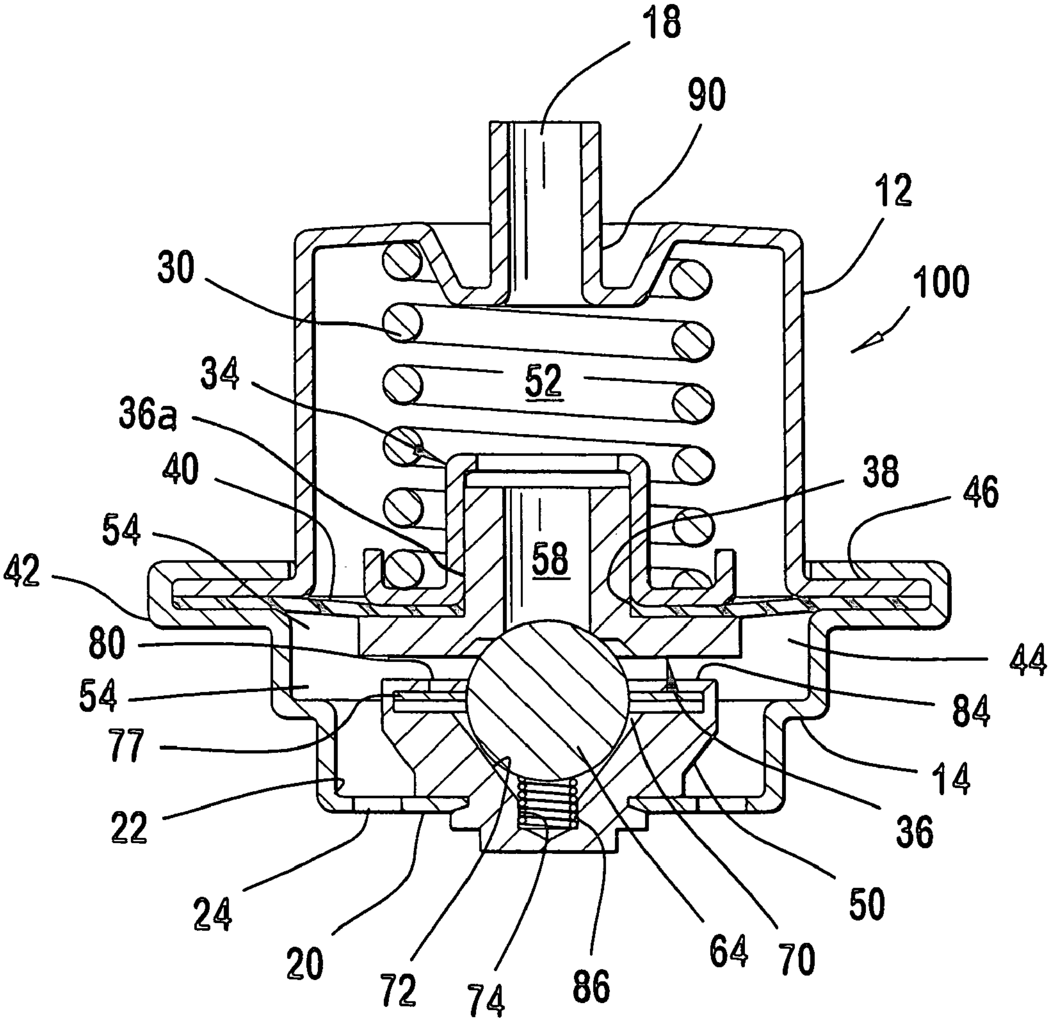
FIG. 1 is a partial cross-section view of a flow-through type pressure regulator according to a first preferred embodiment that includes a spring retainer that is press-fit with a seat.

Referring to FIG. 1, there is illustrated a flow through pressure regulator 100 having a first cup shaped cover 12 and a second cup shaped cover 14 that are crimped together to form an unitary hollow member. In the axially aligned center of an enclosed end 16 of the first cover 12 is an outlet port 18 wherein fuel flows out of the regulator 10. The outlet port 18 is turned upward forming a tubular exit port 90, the length or height of which functions to alter the back pressure in the regulator 100, which affects the amount of flow through the pressure regulator 100. Around a bottom 20 of an enclosed end 22 of the second cover 14 is located at least one fuel inlet aperture 24 for receiving fuel into the regulator 10.

The first cover 12 has a dimpled center portion 26 in the enclosed end 16 forming the fuel outlet port 18 and a spring locator means 28. A bias means such as a spring 30 functions to bias the valve seat member 36 of the regulator 10 at a predetermined amount of pressure that relates to the pressure desired by the regulator. One end of the spring 30 is located in a spring retainer 34 that is secured to a portion of the valve seat member 36 that extends through a central aperture 38 in a diaphragm 40. The diaphragm 40 is supported around its circumference on a circumferential flange 42 radially extending from the open end 44 of the second cover 14 and is crimped between a circumferential flange 46 extending radially outward of the open end 48 of the first cover 12. Preferably, the flange 42 of the second cover 14 is rolled-over the circumferential edge of the first cover 12 and crimped to form the unitary member. At the enclosed end 22 of the second cover 14 is a valve 50 that is secured to the second cover 14.

Both the first 12 and second 14 covers are essentially cup shaped tubular members which are closed at one end and opened at the other end forming a first chamber 52 in the first cover 12 and a second chamber 54 in the second cover 14.

Mounted in the central aperture 38 of the diaphragm 40 is the valve seat member 36 that is secured to the diaphragm by means of the spring retainer 34. The diaphragm 40 forms the boundary between the first 52 and second 54 chambers. The valve seat member 36 has a central flow through passageway 58 that is open into the first 52 or outlet chamber formed in the first cover 12. At the other end of the passageway 58 is a sealing surface on which is seated another valve member 50, which preferably includes a spherical ball 64. This end of the valve seat member 36 opens into the second 54 or inlet chamber. In the manufacturing of the valve seat member 36, the sealing surface can be coined to assure a smooth sealing surface for the ball 64.

The ball valve actuator 64 is located in a conical chamber 70 of the valve 50. At the bottom 72 of the conical chamber 70 is an enclosed tubular bore 74 opening. This conical chamber 70 is sized so as to not interfere with the movement of the ball 64. The ball 64 is retained by a ball retainer 76 that is preferably a washer shaped member 77 that has a central aperture that is somewhat smaller than the diameter of the ball 64. Preferably, this central aperture is coined to prevent a rough surface contacting the ball 64. At the wide end 80 of the conical chamber 70 there is formed a pocket. The washer shaped member 77 has an outside diameter that is smaller than the diameter of the pocket and is retained in the axial direction by crimping of the upper edge 84 over the washer shaped member 77. The ball retainer 76 is not held tightly in the pocket at the end of the conical chamber 70, but is free to move both axially and radially in the pocket.

In the enclosed tubular bore 74, a light bias spring 86 is positioned to move the ball 64 in an axial direction away from the bottom 72 of the conical chamber 70. The spring 86 biases the ball 64 and the ball retainer 76, which is located above the major diameter of the ball or its horizontal axis, against the inside of the upper edge 84.

The spring 86 functions to bias the ball 64 against the sealing surface of the valve seat member 36. When the pressure at the inlet fuel is greater than the force exerted by the large bias spring 30, the diaphragm 40 moves in an axial direction and the ball 64 leaves the valve seat member 36. Fuel can then flow through the regulator 10 until the pressure of the large bias spring 30 is strong enough to return the valve seat member 36 to the ball 64 surface, thus closing the passageway 58 in the valve seat member 36.

The material of the several part of the fuel regulator is preferably stainless steel or some similar material which resists corrosion due to the nature of the fuel.

According to the first preferred embodiment shown in FIG. 1, the spring retainer 34 includes a cap like diaphragm-to-seat retainer that is press-fit over the seat 36 of the flow-through type regulator 100. An undercut on the surface 36*a* of the seat 36 grabs onto the spring retainer 34, and along with the force of the press-fit, holds the spring retainer 34 in place with respect to the seat 36.

Figure 2:
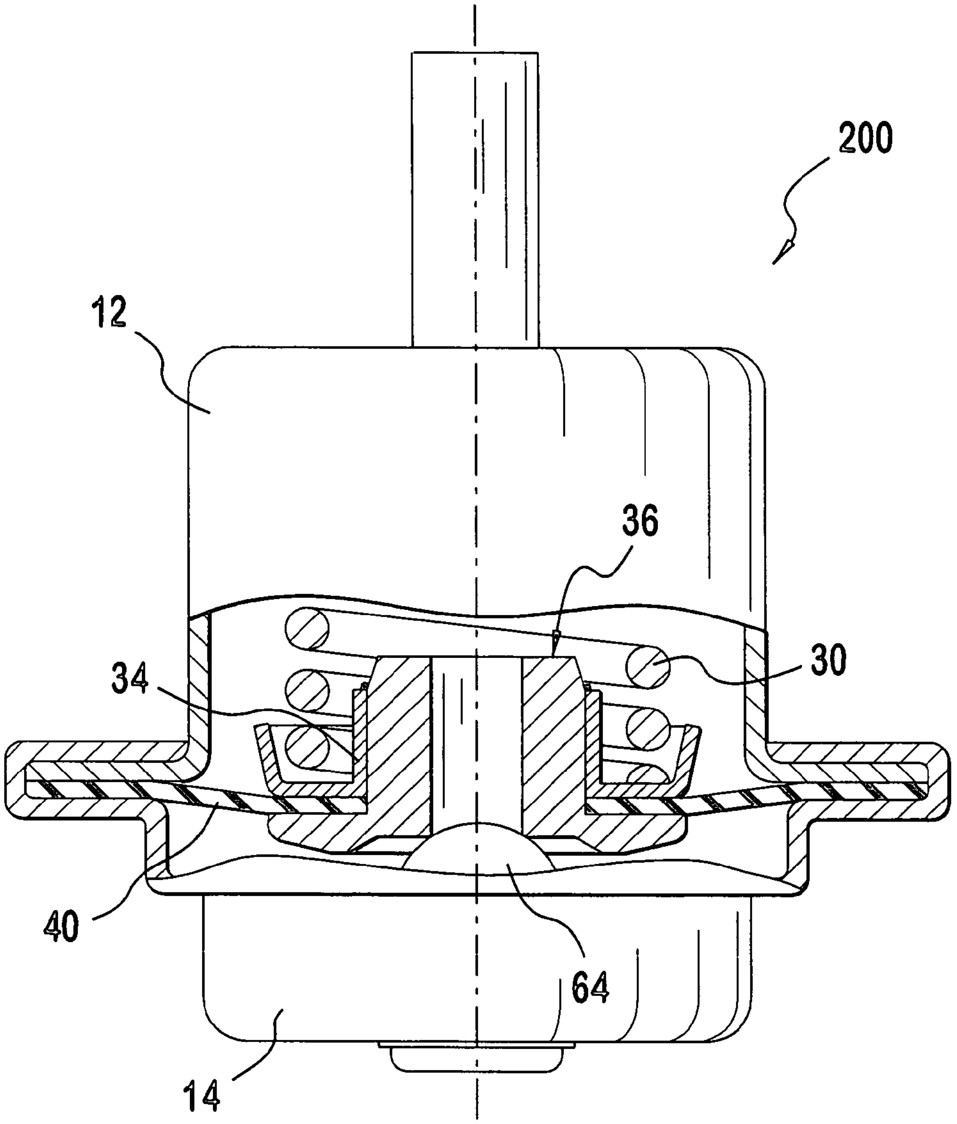
FIG. 2 is a partial cross-section view of a flow-through type pressure regulator according to a second preferred embodiment that includes a spring retainer that is press-fit with a seat.

According to the second preferred embodiment shown in FIG. 2, the spring retainer 34 includes a ring-like diaphragm-to-scat retainer that is press-fit over the seat 36 of a flow-through type regulator 200. According to the regulator 200, the spring retainer 34 is held in place with respect to the surface of the seat 36 by the force of the press-fit.

A weld, e.g., a laser weld, between an end surface of the spring retainer 34 and the surface of the seat 36 may provide additional strength to the coupling between the spring retainer 34 and the seat 36.

Figure 3:
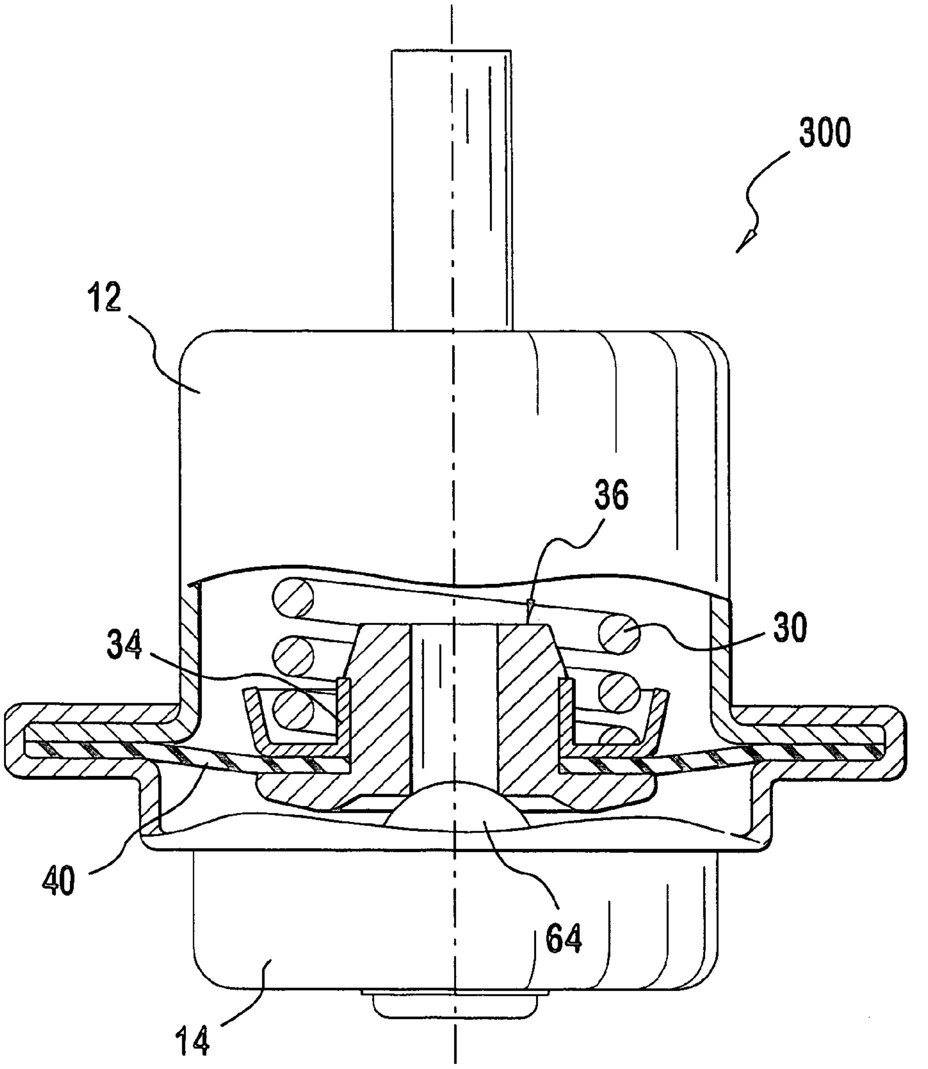
FIG. 3 is a partial cross-section view of a flow-through type pressure regulator according to a third preferred embodiment that includes a spring retainer that is press-fit with a seat.

According to the third preferred embodiment shown in FIG. 3, a flow-through type regulator 300 includes a ring like diaphragm-to-seat spring retainer 34 that is pressed over an undercut on the surface of the seat 36. The spring retainer 34 snaps into the undercut edge and is held in place thereby with respect to the seat 36.

Figure 4:
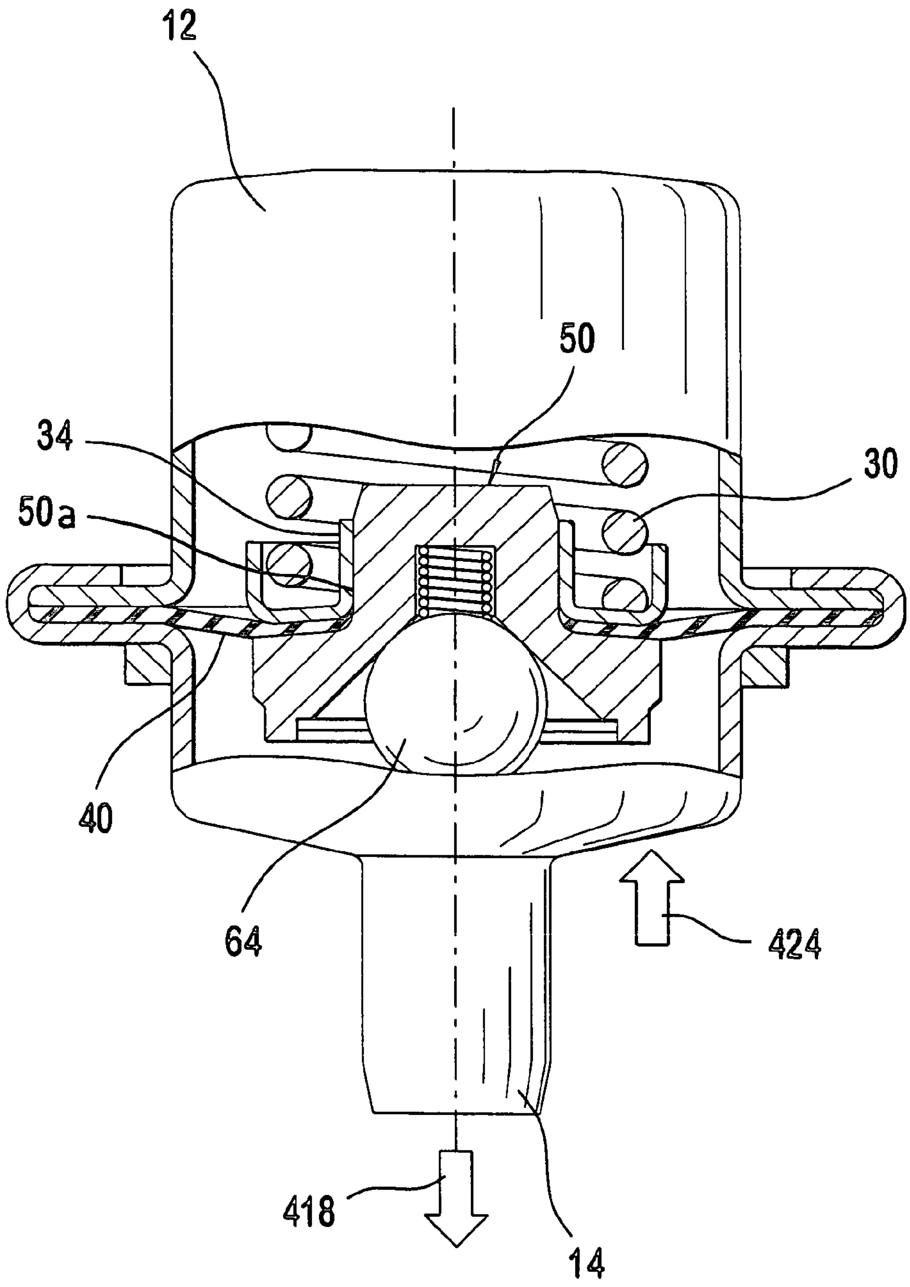
FIG. 4 is a partial cross-section view of a by-pass valve type pressure regulator according to a fourth preferred embodiment that includes a spring retainer that is press-fit with a seat.
Figure 5:
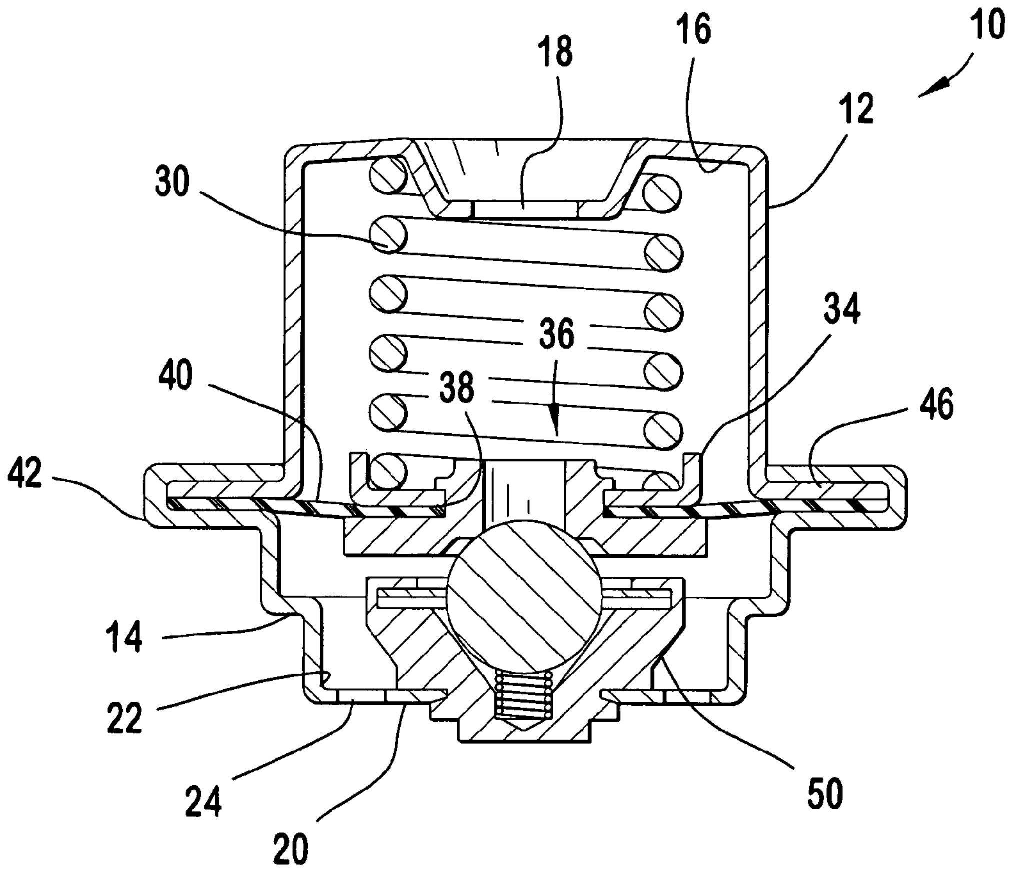
FIG. 5 (Prior Art)
FIG. 5 is a cross-section view of a known flow-through pressure regulator that includes a spring retainer that is staked to a seat.

According to the fourth preferred embodiment shown in FIG. 4, the spring retainer 34 includes a ring-like diaphragm-to-valve member spring retainer that is press-fit over the valve 50 of a by-pass valve type pressure regulator 400. According to the regulator 400, the spring retainer 34 is held in place with respect to the surface of the valve 50 by the force of the press-fit. Additionally, an undercut 50*a* on the surface of the valve 50 grabs onto the spring retainer 34, and along with the force of the press-fit, holds the spring retainer 34 in place with respect to the valve 50. Preferably, fluid flow through the by-pass valve type regulator 400 passes in 424 via an inlet formed in the second cover 14, between the valve 50 and the seat (not shown), and then passes out 418 through an outlet that is also formed in the second cover 14.

One method of assembling the pressure regulator 100, 200,300,400 is to assemble the spring retainer 34, valve seat member 36 (per FIGS. 1–3) or valve 50 (per FIG. 4), and diaphragm 40 into a divider unit. The assembled unit, along with the spring 30, is mounted between the first and second covers 12,14. According to the present invention, the spring retainer 34 is press-fitted with respect to either the valve seat member 36 or the valve 50.

Preferably, the divider unit is assembled by installing central aperture 38 of the diaphragm 40 around the valve seat member 36, so as to surround the passageway 58, and press fitting the spring retainer 34 onto the valve seat member 36 so as to sealingly sandwich therebetween the diaphragm 40. The valve seat member 36 may also include an undercut edge into which the spring retainer 34 snaps so as to hold the spring retainer 34 in place with respect to the valve seat member 36.

And as shown in FIG. 4, the arrangement of the valve seat member 36 and the valve 50 may be reversed such that the diaphragm 40 and the spring retainer 34 are press-fitted with respect to the valve 50, and the valve seat member is generally fixed to the first cover 12.

The spring 30 is installed in the second cover 14. Preferably, a first end of the spring 30 is positioned with respect to the second cover 14, and a second end of the spring 30 is positioned with respect to the spring retainer 34.

The first and second covers 12,14 are then matingly engaged. Preferably, the flanges 42,46 of the first and second covers 12,14 are abutted against one another and then crimped together. Of course, other coupling techniques, e.g., welding or adhering, may be used to secure the first and second covers 12,14 with respect to one another.

The operation of the flow-through pressure regulator 100,200,300 in a fuel system will now be described. The spring 30 acts through the spring retainer 42 to bias the divider unit toward the valve 50. In a first configuration, the sphere 64 is seated against the valve seat member 36 so as to prevent a flow of fuel through the passage 58, and thus through the pressure regulator 100,200,300,400.

Fuel enters the regulator 100,200,300 through fuel inlet aperture(s) 24 and exerts pressure on the divider unit. When the force of the fuel pressure acting on the divider unit is greater than the force exerted by the spring 30, the diaphragm 40 flexes so as to allow the valve seat member 36 to move along the longitudinal axis A, and the sphere 64 separates from the valve seat member 36. This is a second configuration that permits the flow of fuel through fuel inlet aperture(s) 24, between the sphere 64 and the valve seat member 36, through the passage 58, and through the fuel outlet port 18. Selection of the spring 30, and more particularly the force exerted by the spring 30 on the divider unit, determines the fuel pressure level at which pressure regulation, i.e., the transition between the first and second configurations, occurs in the pressure regulator 100,200,300.

The operation of the by-pass valve type pressure regulator 400 is similar except that the first and second valve elements are reversed with respect to the housing and the diaphragm, and the fluid in 424 and out 418 through the second cover 14.

A spring retainer that is press-fitted with respect to the valve seat member or valve 50, according to the present invention, eliminates the staking operations that were necessary in known flow-through pressure regulators. Thus, the disadvantages associated with staking, e.g., the need to frequently replace the staking tools due to damage and wear, are eliminated. Accordingly, the present invention provides an easier and more cost-effective way of assembling a flow-through pressure regulator.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A pressure regulator, comprising:

a housing including an inlet and an outlet, the housing defining an interior volume;

a divider separating the interior volume into first and second chambers, the divider including:

a first valve member defining a passage between the first and second chambers;

a diaphragm extending between the housing and the first valve member, fluid communication between the first and second chambers through the diaphragm being prevented; and a retainer securing the diaphragm relative to the first valve member, the retainer including a cylindrical portion and first and second annular portions, the cylindrical portion extending about a longitudinal axis and being press-fitted with respect to the first valve member, the first annular portion extending from the cylindrical portion and extending outwardly from the longitudinal axis, and the second annular portion being spaced along the longitudinal axis from the first annular portion, the second annular portion extending from the cylindrical portion and extending inwardly toward the longitudinal axis; and a second valve member being arranged between first and second configurations relative to the first valve member, the first configuration substantially preventing fluid communication between the inlet and the outlet, and the second configuration permitting fluid communication between the inlet and the outlet.

2. The pressure regulator of claim 1, wherein the housing comprises first and second housing portions, the first housing portion defining the first chamber, and the second housing portion defining the second chamber.

3. The pressure regulator of claim 2, wherein the diaphragm comprises a first perimeter sandwiched between the first and second housing portions.

4. The pressure regulator of claim 3, wherein the diaphragm comprises a second perimeter being sandwiched between the first valve member and the retainer.

5. The pressure regulator of 1, wherein the diaphragm is sandwiched between the first valve member and the first annular portion of the retainer.

6. The pressure regulator of claim 1, comprising:

a resilient element extending along the longitudinal axis and biasing the divider toward the second valve member, the resilient element including a first end engaging the housing and a second end engaging the first annular portion of the retainer.

7. The pressure regulator of claim 2, wherein the first valve member comprises a seat defining a passage between the first and second chambers, fluid communication between the first and second chambers through the passage being permitted in the second configuration, the first housing part comprises the inlet and the second housing part comprises the outlet, and the inlet and the outlet being aligned along a longitudinal axis.

8. The pressure regulator of claim 1, wherein the second annular portion defines an opening generally aligned with the passage.

9. The pressure regulator of claim 7, wherein the seat comprises first and second seat portions, the first seat portion being disposed in the first chamber, and the second seat portion being disposed in the second chamber.

10. The pressure regulator of claim 9, wherein the second valve member in the first configuration contiguously engages the first seat portion, and the second valve member in the second configuration is spaced from the first seat portion.

11. The pressure regulator of claim 7, wherein the second valve member comprises a sphere.

12. A pressure regulator, comprising:

a housing defining an interior volume, the housing including:

a first housing portion including an inlet;

a second housing portion; and an outlet;

a divider separating the interior volume into first and second chambers, the divider including:

a first valve member defining a passage between the first and second chambers;

a diaphragm extending between the housing and the first valve member, fluid communication through the diaphragm being prevented; and a retainer securing the diaphragm relative to the first valve member, the retainer including a cylindrical portion and first and second annular portions, the cylindrical portion extending about the longitudinal axis and being press-fitted with respect to the first valve member, the first annular portion extending from the cylindrical portion and extending outwardly from the longitudinal axis, and the second annular portion being spaced along the longitudinal axis from the first annular portion, the second annular portion extending from the cylindrical portion and extending inwardly toward the longitudinal axis; and a second valve member being arranged between first and second configurations relative to the first valve member, the first configuration substantially preventing fluid communication between the inlet and the outlet, and the second configuration permitting fluid communication between the inlet and the outlet.

13. The pressure regulator of claim 12, wherein the first valve member comprises a seat, the second valve member comprises a sphere, and the first housing part comprises the outlet, the seat being fixed with respect to the first housing portion and providing fluid communication between the first chamber and the outlet.

14. The pressure regulator of claim 12, wherein the diaphragm is sandwiched between the first valve member and the annular portion of the retainer.

15. The pressure regulator of claim 12, comprising:

a resilient element extending along the longitudinal axis and biasing the divider toward the second valve member, the resilient element including a first end engaging the second housing portion and a second end engaging the annular portion of the retainer.

* * * * *